United States Patent [19]

Scheidweiler et al.

[11] E Re. 30,117

[45] Reissued Oct. 16, 1979

[54] IONIZATION-TYPE FIRE OR SMOKE SENSING SYSTEM

[75] Inventors: Andreas Scheidweiler, Uerikon; Otto Meier, Hombrechtikon, both of Switzerland

[73] Assignee: Cerberus AG, Mannedorf, Switzerland

[21] Appl. No.: 877,561

[22] Filed: Feb. 13, 1978

Related U.S. Patent Documents

Reissue of:

[64] Patent No.: 4,037,106
Issued: Jul. 19, 1977
Appl. No.: 699,333
Filed: Jun. 24, 1976

[30] Foreign Application Priority Data

Jul. 25, 1975 [CH] Switzerland ..... 9710/75

[51] Int. Cl.[2] ..... G08C 1/00

[52] U.S. Cl. ..... 250/381; 250/385; 307/310; 340/629

[58] Field of Search ..... 250/281, 285; 307/310; 340/237 S

[56] References Cited

U.S. PATENT DOCUMENTS

| | | | |
|---|---|---|---|
| 3,564,524 | 2/1971 | Walthard et al. | 340/237 S |
| 3,676,680 | 7/1972 | Scheidweiller et al. | 250/385 |
| 3,701,004 | 10/1972 | Tuccinardi et al. | 307/310 |
| 3,718,919 | 2/1973 | Sasaki et al. | 250/381 |
| 3,728,706 | 4/1973 | Tipton et al. | 250/381 |
| 3,742,262 | 6/1973 | Ichinohe et al. | 307/310 |
| 3,760,199 | 9/1973 | Graeme | 307/310 |
| 3,899,693 | 8/1975 | Gaudreault | 307/310 |
| 3,909,815 | 9/1975 | Gacogne | 250/381 |
| 3,946,374 | 3/1976 | McMillian | 340/237 S |

*Primary Examiner*—Harold A. Dixon
*Attorney, Agent, or Firm*—Flynn & Frishauf

[57] ABSTRACT

To render an ionization-type sensing element essentially immune to changes in ambient conditions, principally temperature or operating voltage, while still using low-current draining circuits to sense response of the ionization chamber of the sensor, the threshold response level of a field effect transistor (FET) is arranged to have approximately the same temperature response characteristic, within the range of ambient temperature considered, as the ionization cell so that the overall circuit or system combination of the cell and FET amplifier will have a response which is essentially independent of ambient temperature or similar conditions. The source path of the FET is connected to a voltage divider which is so dimensioned that the voltage division ratio ($R_2/R_1$) is related to the temperature coefficient ($\alpha$) of the base-emitter voltage of the FET and the temperature coefficient ($\beta$) of the measuring ionization cell chamber:

$$R_2/R_1 = (\beta/\alpha) - 1.$$

9 Claims, 1 Drawing Figure

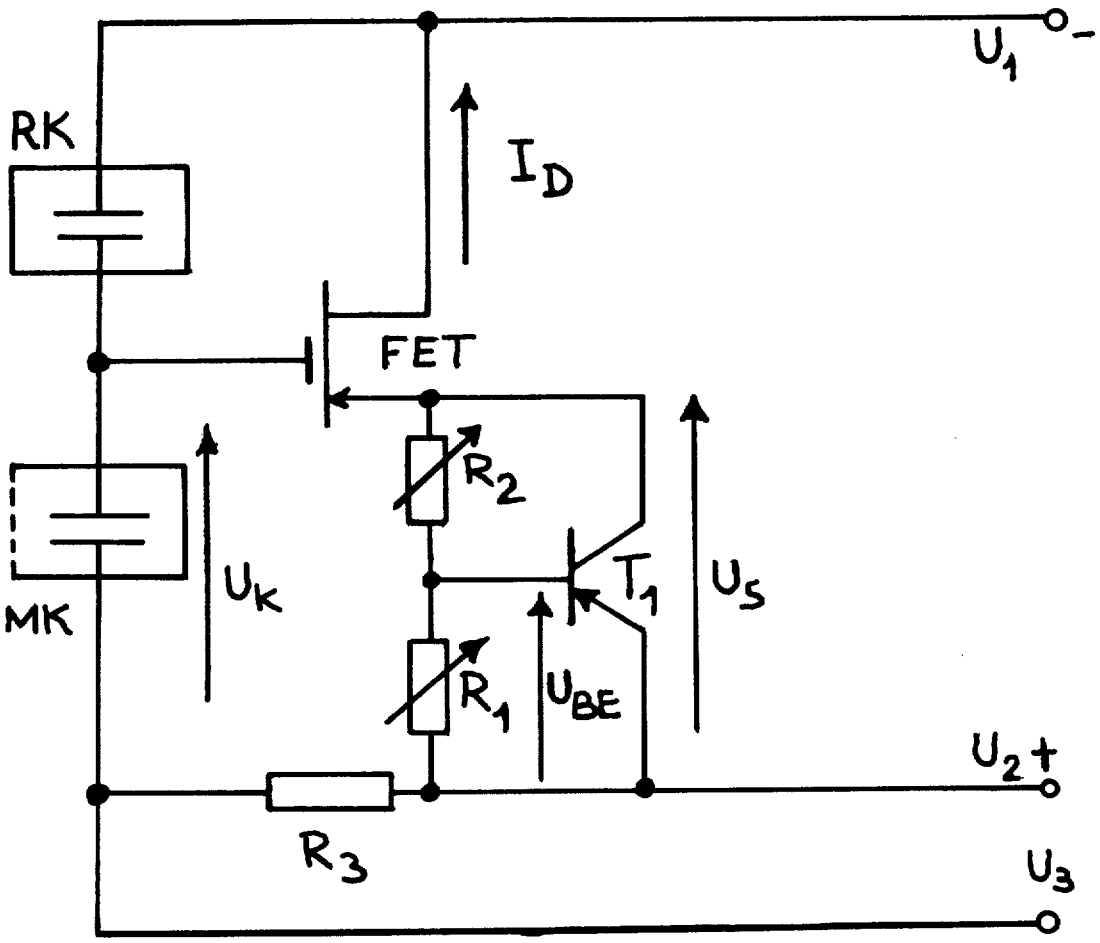
U1 -
RK
ID
FET
R2
T1
US
UK
MK
R1
UBE
U2 +
R3
U3

IONIZATION-TYPE FIRE OR SMOKE SENSING SYSTEM

Matter enclosed in heavy brackets [ ] appears in the original patent but forms no part of this reissue specification; matter printed in italics indicates the additions made by reissue.

Cross reference to related patents, all assigned to the assignee of the present application: U.S. Pat. Nos. 3,710,110; 3,767,917; 3,908,957.

The present invention relates to an ionization-type fire and smoke sensor having a sensing element which includes a measuring ionization chamber connected in series with a resistor and a field effect transistor (FET) connected to the sensing element. The field effect transistor provides an amplified output; its characteristics are so selected with respect to the measuring ionization chamber and the overall circuit that the FET becomes conductive when the sensing ionization chamber provides an output voltage in excess of a predetermined threshold value. Reference is made to the cross-referenced patents for construction of such sensors.

Ionization-type smoke and/or fire sensors must meet high and difficult requirements: Operating as smoke detectors, they should provide a sensing indication as early as possible upon occurrence of a fire; they must, however, also operate under severe ambient conditions, and should be essentially immune to climatic influences such as temperature changes, wind, humidity, presence of corrosive gases, overall corrosion, and should additionally be immune to electrical extraneous influences, such as changes of supply voltage. Further, the sensors, when combined in a fire alarm system, must operate economically, that is, with low quiescent current, so that many sensing units can be located in the space to be supervised, or the supervised space extended. Additionally, the operating condition and operability of the sensors to provide sensing output should be capable of being checked simply by electrical test circuits.

It is difficult to provide an ionization-type sensor which desirably meets all the requirements placed thereon; known sensors, while highly satisfactory in many respects, can still be improved to provide for better operating and application characteristics.

It has previously been proposed to make ionization-type smoke detectors essentially independent of operating voltage by using a saturated reference ionization chamber as a resistance element in the circuit system. Change of the operating voltage then holds the voltage applied to the measuring ionization chamber, that is, the unsaturated chamber, at a constant level. Such systems have the disadvantage of high temperature dependence, that is, the temperature response characteristic of the measuring ionization chamber varies greatly with temperature. The alarm threshold output level of the measuring ionization chamber shifts approximately linearly with temperature. Use of symmetrical ionization chambers in which ambient temperature changes mutually compensate each other have been proposed; the alarm threshold level of the fire or smoke sensor still is dependent on operating voltage, however.

Smoke and fire sensing elements which are included in a sensing and alarm system should use as little current as possible. The elements should be economical in operation. It has been proposed to use an FET as the first electronic active element of the evaluation circuitry connected to the ionization chamber, for example by connecting the control or gate electrode of the FET with the junction between the measuring ionization chamber and the reference ionization chamber. The FET is normally in the blocked state. The source voltage is so connected and dimensioned that it is higher than the blocking voltage. Such ionization-type smoke detectors have the disadvantage that the alarm threshold level then changes with changes in ambient conditions. Simultaneous compensation for all changes in ambient conditions was not possible since the customary arrangements to effect such compensation were usually mutually exclusive.

It is an object of the present invention to provide an ionization-type smoke and fire detector system which, simultaneously, meets the following requirements.

(1) Economy; (2) independence of the alarm threshold of operating voltage; (3) independence of the alarm threshold of ambient surrounding temperature—within reasonable limits; (4) low quiescent current, (5) simple checking or test arrangements by electrical checking or testing.

Subject matter of the present invention

Briefly, the fire or smoke sensing system includes an arrangement to automatically control the threshold value, within suitable limits of application, which has a substantially similar temperature response characteristics as that of the sensing element, and which, by its inherent operation, retains the threshold value of response, within the temperature range, essentially independent of ambient temperature.

The system, in a preferred form, includes an FET which is connected to the ionization chamber, and is further connected to a control circuit [which has a temperature response characteristic which maintains the threshold of response of the FET essentially independent of ambient temperature]. In accordance with a preferred embodiment, a voltage divider is connected to the FET, the tap point of the voltage divider being connected to the gate or control electrode of the FET, and the voltage divider being so dimensioned and arranged relative to the FET and the ionization chamber to render the overall response essentially temperature independent.

The invention will be described by way of example with reference to the accompanying drawing, wherein the single FIGURE is a schematic circuit diagram of the system of the present invention.

The ionization smoke detector cell is an unsaturated sensing ionization chamber MK. This chamber MK is exposed to ambient air as schematically indicated by the broken lines thereof. The ion current within this chamber is dependent on smoke concentration in the air to which the chamber is exposed. Chamber MK is connected in series with a reference ionization chamber RK. Reference ionization chamber RK is essentially closed and saturated. The junction point of the two ionization chambers MK and RK is connected to the gate electrode of an FET. The FET is, for example, an MOS-FET, preferably with a high gate resistance. A typical FET useful in the present invention is of the type MEM 520 (General Instruments). The source path of the FET is connected to an electrical circuit including the collector-emitter path of a transistor T1 and resistors R2 and R1 connected in parallel thereto and forming a voltage divider. The tap point of the voltage divider is connected to the base of the transistor T1.

The resistors R1, R2, or at least one of them preferably, are adjustable.

Operation: The source voltage $U_S$ for the FET is determined by the circuit formed by transistor T1 and the resistors R1, R2. This source voltage$U_S$ is so selected that the sum of the voltage $U_S$ and the threshold voltage of the FET is slightly greater than the voltage drop $U_K$ across the measuring ionization chamber MK when the ionization chamber is in quiescent, that is, non-smoke sensing condition. The threshold voltage of chamber MK, therefore, when smoke or fire aerosols are absent, will be slightly greater than the threshold voltage of the FET and hold the FET in blocked, non-conductive condition. If smoke or fire aerosols penetrate into the measuring chamber MK, the resistance thereof will increase and, as soon as the voltage drop $U_K$ exceeds the sum of the voltage formed by the source voltage and the threshold voltage, the FET will become conductive and an alarm current will flow over the lines $U_1$ and $U_2$ to a central alarm station (not shown).

The drain circuit of the FET may include a further resistor; voltage drop across that resistor may, as known, control other switching devices, for example additional alarm circuits.

The voltage drop $U_K$ across the measuring ionization chamber of the ionization sensor is highly dependent on ambient temperature. Thus, when such an ionization chamber is used in practical environments, the alarm threshold level will change in accordance with ambient temperature changes. Such an ionization chamber, thus, would respond later with some temperatures than with others. In order to avoid this highly undesirable characteristic of the ionization chamber, the electrical circuit is so arranged that the temperature coefficients of the circuit in series with the FET are similar to that of the measuring ionization chamber MK. Accordingly, the temperature coefficient is obtained by selecting the relationship of the resistors $R_2/R_1$, and hence the amplification of the transistor T1 in such a way that the difference of $U_K$ and $U_S$ will remain constant upon changes in temperature. This means, of course, that the resistance relationship must be matched to the temperature coefficient of the transistor T1. The resistors R1, R2 may, if desired, also be temperature-responsive resistors to further enhance the effects of the circuit, that is, the resistors may be temperature dependent, and so arranged that the above referred-to condition will be fulfilled, that is, that $(U_K-U_S)$ will be independent of temperature, at least within a certain temperature range which is usual in the space where the ionization sensor is employed, for example within the temperature range through which the ambient temperature varies. If the ionization chamber is to be employed under extreme conditions, the range should be selected to be approximately in the area of normal or most applicable operating temperature. Various operating conditions can be matched by adjustment of one, or both of the resistors R1, R2.

In an actual example, an ionization chamber which has a chamber structure MK as disclosed in cross-referenced U.S. Pat. No. 3,908,957 was combined with a system in accordance with the present invention to provide an approxiately constant temperature response. The temperature response characteristic of this chamber, by and itself, is essentially linear in the temperature range between −10° C. and +50° C. The temperature coefficient is:

$$U_K = U'_k + \beta\Delta T$$

in which $U'_k$ is a base constant, and $\beta$ is −25 mV/°K.; $\beta$ thus is expressed in mV/°K. Transistor T1 is a silicon transistor having a temperature-vs.-base emitter voltage characteristics of; $U_{BE}=U'_{BE}+\alpha\Delta T$, in which the temperature coefficient is: $\alpha=-1.5$ mV/°K. The collector-emitter voltage, and thus the source voltage of the FET, will then be:

$$U_S = \frac{(R_1 + R_2)}{R_1}(U_{BE} + \alpha\Delta T).$$

Substituting in the relationship $(U_K-U_S)$=constant then results in a resistance ratio for the voltage divider: $R_2/R_1=(\beta/\alpha)-1$. This ratio will then provide for an alarm threshold which is constant and temperature independent within the range of linear temperature-resistance characteristics of the chamber MK and of the transistor T1. The resistance ratio for the above ionization chamber and transistor will then be: $R_2/R_1=15.6$. At this resistance ratio, the circuit will be temperature independent. In a practical example, transistor T1 was of the type BC 320, resistor R1 = 10kΩ, and resistor R2 = 150 KΩ. The FET was of the type MEM 520, having a threshold voltage of about 3.5 V. The line voltages $U_1$ and $U_2$ were about 20 V. The chamber voltage UK', under non-conductive condition, was about 8 V. This system then is essentially temperature independent within a wide temperature range, and operates with improved and uniform sensitivity throughout that range while being, additionally, essentially independent of operating voltage. This arrangement also has the other advantages required, in that the quiescent current is extremely small, while being made of components which are simple and inexpensive, so that the overall system can be cheaply made.

The system has a further advantage. It is a simple matter to supervise operability thereof. Introducing an additional resistor R3 in series with the measuring chamber MK and connecting a control line to a test terminal $U_3$ permits checking of the operability of the chamber. The resistor R3 may, for example, have about 20 kΩ.

Various changes and modifications may be made within the scope of the inventive concept.

We claim:

1. Ionization-type fire or smoke sensing system having a source of electrical supply (U1, U2):

a measuring ionization chamber (MK);

a series resistance element (RK) connected in series with the measuring ionization chamber (MK);

a field effect transistor (FET) connected to the measuring ionization chamber, said FET having a conduction threshold voltage which is just above the level of the output voltage ($U_k$) of the measuring ionization chamber (MK) when smoke or fire aerosols are absent, so that, upon presence of smoke or fire aerosols, the output voltage of the chamber will rise and the FET will become conductive to provide an output signal;

and temperature control means (T1, R1, R2) to render the circuit combination of the ionization chamber (MK) and the FET essentially independent of temperature within a given range, comprising a transistor (T1) having its collector-emitter path connected in the source supply path of the FET;

and a voltage divider (R1, R2) connected in parallel with the collector-emitter path of the transistor (T1), the tap point of the voltage divider being connected to the base of the transistor (T1);

to provide a temperature compensation characteristic which has the same relative control direction as the temperature characteristic of the measuring ionization chamber (MK) and dimensioned with respect to the FET to maintain [the conduction threshold thereof] *the difference of said output voltage ($U_k$) and of the voltage ($U_s$) at the source of said FET* essentially independent of temperature within said range.

2. System according to claim 1, wherein at least one of the resistors of the voltage divider (R1, R2) is adjustable.

3. System according to claim 1, wherein at least one of the resistors of the voltage divider (R1, R2) is a temperature dependent resistor having a resistance value which depends on ambient temperature.

4. System according to claim 1, further comprising a further resistor (R3) connected in series with the measuring ionization chamber (MK) and the source voltage;

the junction point between the further resistor (R3) and the chamber (MK) forming a test voltage terminal (U3).

5. System according to claim 1, wherein the series resistance element (RK) comprises a saturated reference ionization chamber.

6. System according to claim 1, wherein the transistor (T1) and the voltage divider (R1, R2) are selected to have a temperature characteristic such that the voltage drop of the network formed by the voltage divider (R1, R2) and the transistor (T1) has essentially the same temperature coefficient as the temperature coefficient of the voltage drop across the measuring ionization chamber (MK), so that the temperature characteristics of the source voltage applied to the FET will be similar to the temperature characteristics of the voltage drop across the measuring ionization chamber.

7. System according to claim 6, wherein the voltage division ratio ($R_2/R_1$), the temperature coefficient ($\alpha$) of the base-emitter voltage of the transistor (T1), and the temperature coefficient ($\beta$) of the measuring ionization chamber (MK) have at least approximately the following relationship:

$$R_2/R_1=(\beta/\alpha)-1,$$

wherein $R_2/R_1$ is the ratio of resistance values of the voltage divider; $\alpha$ is the temperature coefficient of the base-emitter voltage of the transistor (T1) and $\beta$ is the temperature coefficient of the measuring ionization chamber (MK).

8. System according to claim 7, wherein the FET comprises a high gate resistance, MOS-type FET.

9. System according to claim 7, wherein the series resistance element (RK) comprises a saturated reference ionization chamber and wherein the FET is of the MOS type.

* * * * *

UNITED STATES PATENT AND TRADEMARK OFFICE

CERTIFICATE OF CORRECTION

PATENT NO. : Reissue 30117

DATED : October 16, 1979

INVENTOR(S) : Andreas SCHEIDWEILER

It is certified that error appears in the above-identified patent and that said Letters Patent are hereby corrected as shown below:

Column 2, line 41, change "the FET" to -- a transistor --

Signed and Sealed this

*Fourth* Day of *March 1980*

[SEAL]

*Attest:*

SIDNEY A. DIAMOND

*Attesting Officer*

*Commissioner of Patents and Trademarks*